United States Patent [19]
Rickard et al.

[11] Patent Number: 4,628,443
[45] Date of Patent: Dec. 9, 1986

[54] TEST INITIATING APPARATUS FOR APPLIANCES HAVING SELF-DIAGNOSTIC TESTING CAPABILITY

[75] Inventors: Jimmy R. Rickard; Robert K. Hollenbeck, both of Louisville, Ky.

[73] Assignee: General Electric Company, Louisville, Ky.

[21] Appl. No.: 672,070

[22] Filed: Nov. 16, 1984

[51] Int. Cl.$^4$ .................. G05B 9/02; G06F 11/00; H04M 11/04
[52] U.S. Cl. .................. 364/184; 364/186; 364/551; 371/20; 340/310 CP
[58] Field of Search ............ 364/186, 480, 477, 551, 364/200, 900, 141, 146, 506, 507, 508, 184; 371/15, 20, 17, 24, 29; 340/310 R, 310 CP, 310 A; 219/483; 307/141, 141.8

[56] References Cited
U.S. PATENT DOCUMENTS

| | | | |
|---|---|---|---|
| 2,580,539 | 1/1952 | Goodwin | 177/352 |
| 3,540,030 | 11/1970 | Hartz | 340/310 |
| 3,922,664 | 11/1975 | Wadsworth | 340/276 |
| 4,158,432 | 6/1979 | Van Bavel | 235/304.1 |
| 4,200,224 | 4/1980 | Flint | 371/29 |
| 4,224,530 | 9/1980 | Simcoe et al. | 307/141 |
| 4,245,215 | 1/1981 | O'Conner et al. | 340/310 A |
| 4,245,309 | 1/1981 | Kiefer | 364/400 |
| 4,261,041 | 4/1981 | Starr | 364/571 |
| 4,275,464 | 6/1981 | Schmidt | 371/15 |
| 4,328,482 | 5/1982 | Belcher et al. | 340/310 CP |
| 4,348,582 | 9/1982 | Budek | 219/483 |
| 4,477,901 | 10/1984 | Braband et al. | 371/20 |
| 4,485,472 | 11/1984 | Sproull et al. | 371/15 |
| 4,498,716 | 2/1985 | Ward | 371/24 X |
| 4,521,885 | 6/1985 | Melocik et al. | 371/29 |
| 4,564,942 | 1/1986 | Horiuchi | 371/20 |

Primary Examiner—Jerry Smith
Assistant Examiner—Jon D. Grossman
Attorney, Agent, or Firm—H. Neil Houser; Radford M. Reams

[57] ABSTRACT

A test initiating device connectible to the power cord of an electronically controlled appliance for initiating appliance operation in either a normal operating mode or a self-diagnostic test mode. When so connected the test device is selectively switchable between a first state in which the device is operative to suppress power signal half cycles of one polarity and a second state in which the power signal from the power supply is coupled to the appliance control circuit essentially unchanged. The appliance control circuit includes circuitry operative to generate interrupt pulses marking the pulsations of the power signal applied to the control circuit. Logic circuitry monitors the pulse rate of these interrupt pulses. If a pulse rate different from the corresponding to the normal power supply frequency is detected when the appliance is operating in its start-up mode, signifying the test device is in its first state, the self-diagnostic test mode is initiated, otherwise operation in the normal mode is initiated.

9 Claims, 9 Drawing Figures

TEST INITIATING APPARATUS FOR APPLIANCES HAVING SELF-DIAGNOSTIC TESTING CAPABILITY

BACKGROUND OF THE INVENTION

This invention relates to appliances controlled by logic circuits such as microprocessor based control circuits. More specifically, this invention relates to such appliances featuring a self-diagnostic testing capability.

The use of microprocessor based controls in home appliances, such as clothes washers and dryers, dishwashers, and microwave ovens, is on the increase. In addition to providing greater number of user options in the normal operating mode, such controls also provide the capability for implementing a self-diagnostic test mode which can be useful as a testing tool in production to insure proper operation and facilitate factory adjustments and as an aid to household repair personnel in servicing such appliances in the field.

One example of a self-diagnostic feature may be found in commonly assigned U.S. Pat. No. 4,245,309 which discloses a microprocessor based control circuit for a washing appliance such as a dishwasher which includes a diagnostic system with a diagnostic routine which will sequence through the usual operating cycles in response to operator inputs and which may be advanced through the cycles at the operator's discretion. The cycle in progress and the malfunction, if any, is displayed on the control panel as the diagnostic routine is executed, facilitating diagnosis and repair. The service person initiates the self-diagnostic routine in this example through actuation of hidden switches on the control panel. U.S. Pat. No. 4,158,432 to van Bavel disclosed a self-diagnostic test feature for a microwave oven. This self-test feature causes the system to sequence through test routines whereby all the display lights are lit in a set order, then the displayed digits are actuated sequentially, keyboard inputs entered are displayed as a code, and the magnetron and broiler are turned on. This test routine is initiated by control switches built into the appliance but separate from the keyboard so that the keyboard can be bypassed, allowing testing of the keyboard itself. A further example of a self-diagnostic appliance control is disclosed in U.S. Pat. No. 4,275,464 to Schmidt. The control arrangement in Schmidt enables the microprocessor to perform self-diagnostic testing to locate trouble either in the internal circuitry or the external equipment and input and output devices connected to the microprocessor. To perform the self-diagnostic testing it is necessary for certain of the input and output leads from a microprocessor to some of the external circuits to be altered by removal of the external circuits to which they are associated and cross connection of the leads so that the self-diagnostic testing sequence can proceed. This is facilitated through use of a dummy plug containing cross connecting leads, resistors and capacitors, which plug could be a testing tool carried by an appliance service repair person, but is preferably provided as part of the appliance though not normally connected.

Self-diagnostic routines such as these can be provided primarily through appropriate programming of the microprocessor read only memory in microprocessor based controls. Since this aspect of the self-diagnostic feature requires no increase in hardware it has little impact on the cost of the control. However, means must be provided for enabling the factory worker or service person to initiate the diagnostic routine. As indicated by the foregoing examples, typically such means take the form of hidden switches or plugs or special connectors. The additional hardware and manufacturing costs associated with such routine initiating devices can have significant impact on control cost.

It would therefore be highly desirable to provide a control circuit arrangement which retains the advantages of the self-diagnostic test feature while eliminating the hardware cost associated with hidden switches or other devices incorporated in the appliance to enable the initiation of the self-diagnostic test routine.

It is, therefore, an object of this invention to provide an appliance control circuit having a self-diagnostic feature which is initiated by a simple inexpensive piece of test equipment external to the appliance which requires no special hardware modifications to the appliance itself to enable initiation. The simple test device would be universally applicable to all properly programmed appliance control circuits. Hence, a single testing device could be used by a service person to test numerous types of appliances provided only that the appliance control circuit be properly programmed.

SUMMARY OF THE INVENTION

Therefore, in accordance with the present invention there is provided apparatus for an appliance of the type having a control circuit including logic control means for operating the appliance in a start-up mode each time power is applied to the control circuit and thereafter to selectively operate the appliance in either a normal operating mode or a self-diagnostic/test mode, which apparatus enables the user to initiate operation in the self-diagnostic/test mode. The apparatus comprises a test circuit device adapted for connection in the power line connecting the appliance to its external alternating current power supply. The test circuit device is selectively switchable between a first state and a second state. In its first state the device is operative to suppress power signal half cycles of one polarity. In its second state the full unsuppressed power signal from the power supply is coupled to the appliance control circuit essentially unchanged. Interrupt pulse generating means provided in the appliance control circuit for synchronizing certain control operations with pulsations of the power signal generates interrupt pulses marking the pulsations of the power signal. Advantageous use of these interrupt signals is made in the power-up mode to enable the electronic controller to determine whether the self-diagnostic/test mode or the normal operating mode is to be initiated. To this end, the controller is programmed to monitor the pulse rate of these interrupt pulses during operation in the power up mode to detect a pulse rate different from the pulse rate corresponding to the normal power supply frequency. If a change is detected signifying the test device is in its first state, the controller initiates operation in the self-diagnostic/test mode and if no change is detected, operation in the normal mode is initiated.

Some form of interrupt pulse generating means is conventionally provided in microprocessor based control circuits for synchronization purposes. Thus for appliances employing such circuits only changes to the control routine stored in the read only memory of the microprocessor need be made to facilitate initiation of the self-diagnostic test routine in this manner. No additional hardware or circuitry need to provided within the appliance.

In its preferred form the test circuit device may simply comprise a diode connected in shunt with a test switch. This circuit is switched to its first state by opening the test switch and to its second state by closing the test switch. With the test switch open the power signal to the appliance is rectified by the diode and when the test switch is closed the diode is shunted and the unrectified power signal is coupled directly to the appliance.

In accordance with a further aspect of the present invention to insure proper operation of the various appliance components in the self-diagnostic test mode, the controller, following detection of selection of the diagnostic routine, delays appliance component energization until the test switch is returned to its closed position, thereby insuring that the unrectified power signal is applied to the components following initiation of the self-diagnostic mode.

While in the illustrative embodiment the self-diagnostic routine is implemented in a clothes washing machine, it will be understood that the invention is readily applicable to any type of appliance incorporating electronic logic based control circuitry. A significant advantage of this arrangement is that the same test circuit device can be used in conjunction with any appropriately programmed appliance to initiate the self-diagnostic test routine for that appliance.

BRIEF DESCRIPTION OF THE DRAWINGS

While the novel features of the invention are set forth with particularity in the appended claims, the invention both as to organization and content will be better understood and appreciated from the following detailed description taken in conjunction with the drawings in which:

DETAILED DESCRIPTION

Figure 1:
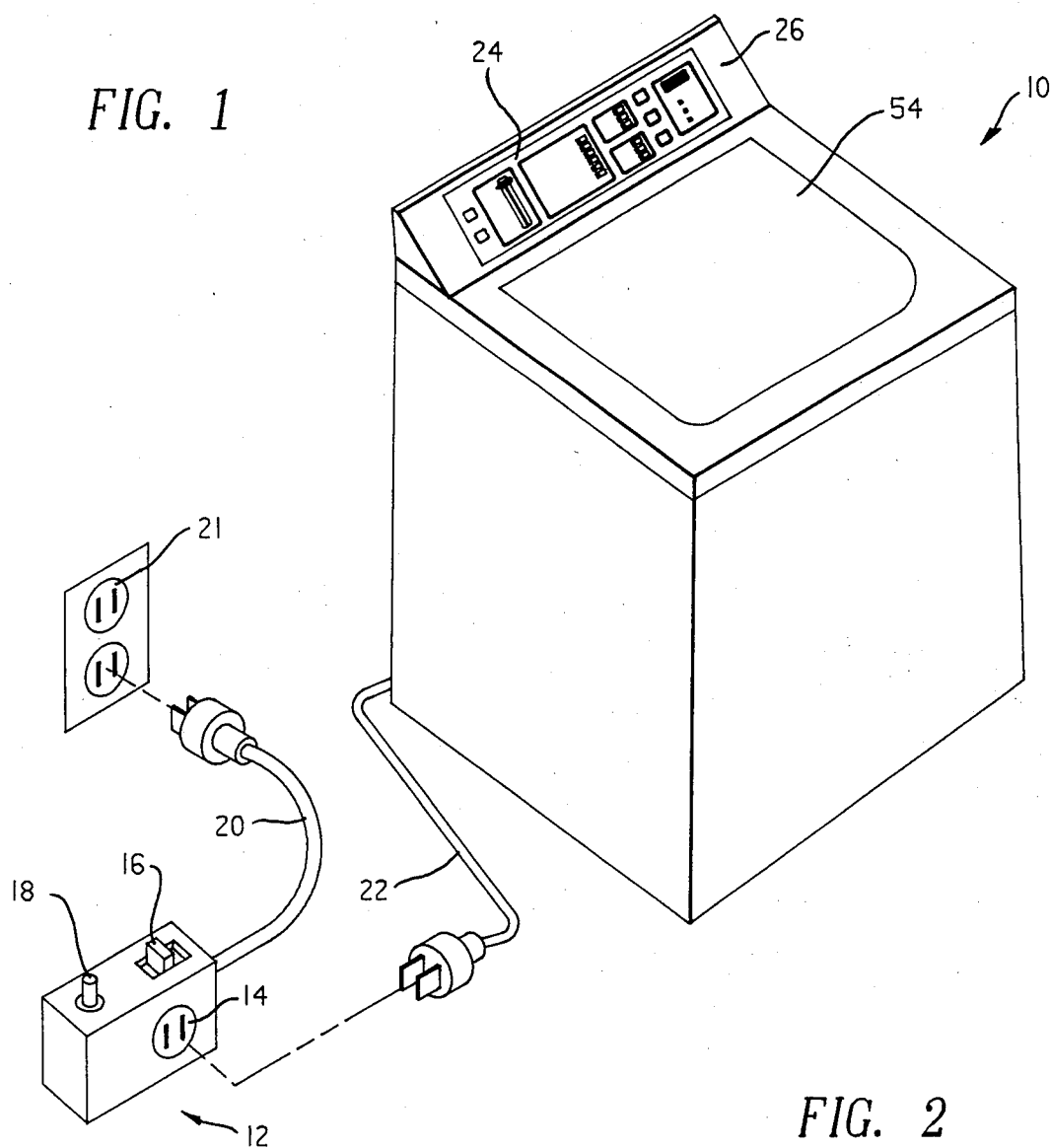
FIG. 1 is a perspective view of an illustrative embodiment of a clothes washing appliance having a microprocessor based control circuit featuring a self-diagnostic test routine and a test circuit device for initiating the test routine in accordance with the present invention arranged for connection to the power cord of the appliance.

Referring first to FIG. 1, a clothes washing appliance 10 controlled by microprocessor based control circuit employing a self-diagnostic/test routine for initiation in accordance with the present invention is illustrated together with a test circuit device 12 which can be used in the factory or by a service person in the field to initiate the operation of the self-diagnostic test routine in the appliance. In this embodiment test device 12 is simply a small box-like structure providing on one face thereof a power plug receptacle 14, an on/off switch 16 and a pushbutton test switch 18. The test device includes a power cord 20 for connection to a standard domestic 120 volt AC power supply receptacle 21.

In normal use the clothes washing appliance 10 is coupled to a 120 volt AC power supply by an appliance power cord 22 adapted to be plugged directly to the power receptacle 21 for the domestic power supply. To initiate operation of the self-diagnostic/test mode in accordance with the present invention test device power cord 20 is connected to receptacle 21 and the appliance power cord 22 is connected to the power plug receptacle 14 of test device 12. It is understood, of course, that clothes washing appliance 10 is merely illustrative and that the concept of the present invention could be similarly applied to any appliance featuring a control circuit incorporating a microprocessor or other logic control circuitry, provided the control logic is appropriately programmed in accordance with the present invention to initiate the self-diagnostic test routine.

Figure 2:
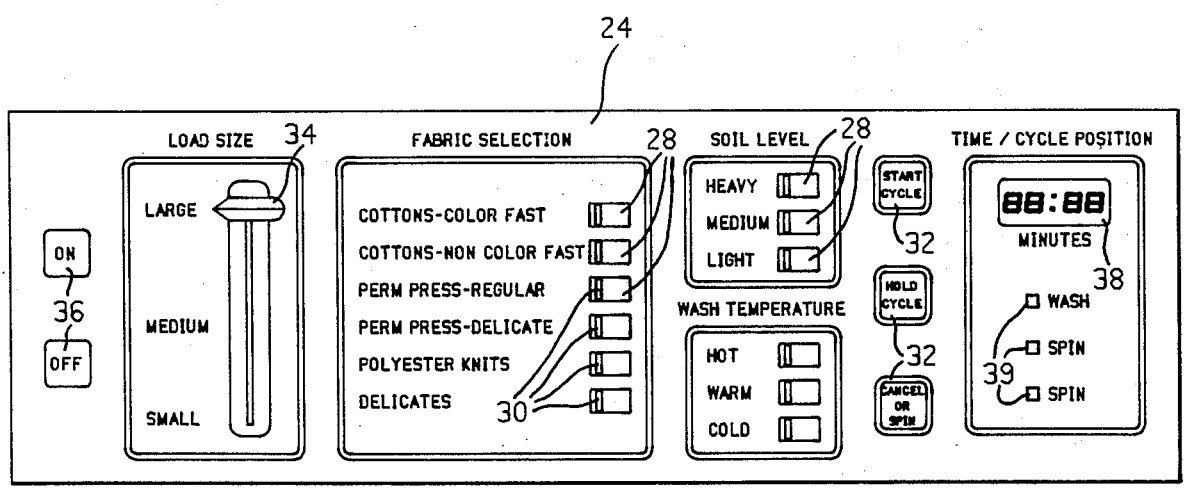
FIG. 2 is an enlarged view of the control panel of the appliance of FIG. 1.

A control and indicator panel 24 is provided on the escutcheon 26 of clothes washer 10. As best seen in FIG. 2, panel 24 includes an array of touch switches 28 enabling the user to designate fabric selection, soil level, wash temperature. Indicator lights 30 associated with touch switches 28 are energized to signify which switches are actuated. Touch switches 32 are provided for start, hold and cancel or spin selection. User actuable slide switch member 34 enables user input of load size selection. Pushbuttons 36 control the mechanical ON/OFF power switch for appliance 10. A four-digit display 38 shows the time remaining in a cycle when operating in the normal mode and provides alphanumeric diagnostic codes when operating in the self-diagnostic test mode. Display lights 39 indicate the progress of the appliance through various stages of the operating cycle.

The washing machine control system controls appliance operation in a normal operating mode and in a self-diagnostic/test mode. A pre-programmed electronic controller in the form of a microprocessor 40 (FIG. 3) is employed to direct the functional operation of the various mechanical and electromechanical, and electronic elements of the washing appliance. The various elements to be controlled include output devices such as solenoids and switching elements actuated by the controller and the display indicator lights and display on control panel 24. The input devices include the user actuable switches provided on control panel 24 of FIG. 2.

Figure 3:
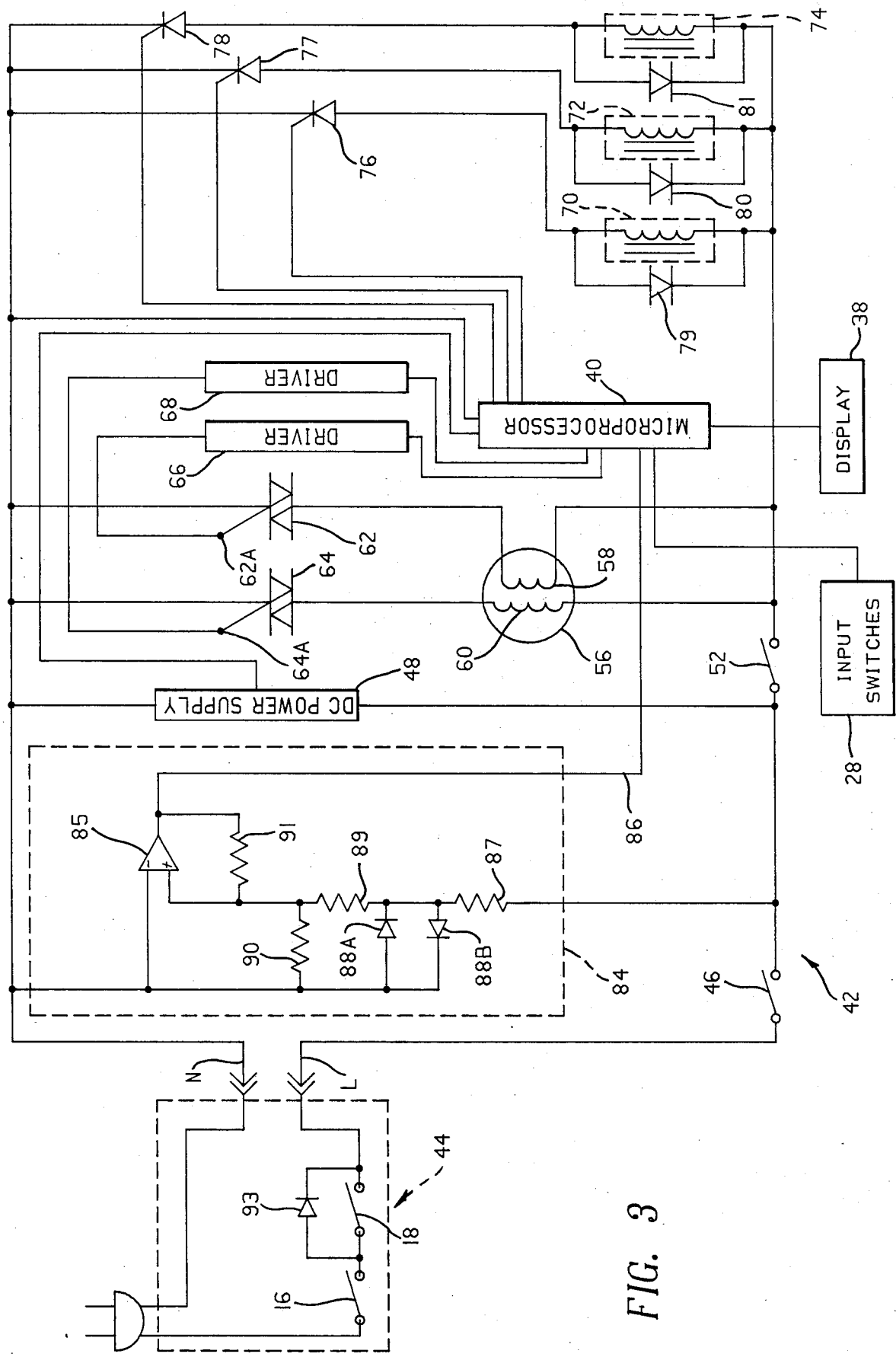
FIG. 3 is a simplified schematic diagram of the control circuit of the appliance of FIG. 1 connected to the test device of FIG. 1.

FIG. 3 illustrates the control circuit 42 of appliance 10 operatively connected to the test circuit 44 of the test circuit device 12 (FIG. 1). It will be appreciated that during normal operation the appliance control circuit power lines L and N, which in FIG. 3 are shown connected to the test device circuitry 44, would be coupled directly to a domestic standard household electrical receptacle. Lines L and N are to be connected to the hot and neutral lines respectively of the power supply.

Appliance control circuit 42 includes ON/OFF switch 46 serially connected in conductor L to isolate the rest of the control circuitry from the power supply when the appliance is turned off by the user. A conventional low voltage DC power supply 48 is connected across conductors L and N to provide low voltage DC for electronic controller 40. Lid actuated switch 52 is connected serially in line L to prevent energization of various operating components in the circuit when the lid 54 (FIG. 1) of the machine is opened.

Electric motor 56 provides means for rotating the agitator and basket (not shown) for wash and spin respectively. Electric motor 56 is a single phase synchronous induction motor of the conventional type including a start winding 58 and a run winding 60. Start winding 58 is connected in series with triac 62 across conductors L and N. Similarly, run winding 60 is serially connected with triac 64 across conductors L and N. Triacs 62 and 64 are conventional thyristors capable of conducting current in either direction irrespective of the voltage polarity across their main terminals when triggered by gate signals of positive or negative polarity applied to the gate terminals respectively. Energization of motor 56 and its direction of rotation are controlled gating signals from controller 40 applied to the gate terminals 62a and 64a of triacs 62 and 64 respectively through conventional amplifying driver circuits 66 and 68 respectively.

Motor 56 is a reversible motor arranged to rotate in one direction for wash and the opposite direction for spin. Motor direction may be determined by the timing of the gate signals to the start and run triacs 62 and 64 respectively. This manner of controlling motor operation is described in detail in commonly assigned U.S. Pat. No. 4,409,532 issued to Hollenbeck et al, the disclosure of which is hereby incorporated by reference.

Water flow into washing machine 10 is controlled by a solenoid operated mixer valve and solenoid valves controlling the hot and cold water in flow. The mixer valve, hot and cold water valve solenoids are designated 70, 72 and 74 respectively in FIG. 3. Each of the valve control solenoids 70, 72 and 74 is serially connected to one of SCRs 76, 77 and 78 respectively across conductors L and N. Diodes 79, 80 and 81 are connected in electrical parallel with solenoids 70, 72 and 74 respectively to act as transient suppressors.

Means are provided in the form of a zero crossing detector circuit 84 connected across conductors L and N to generate interrupt pulses marking the zero crossings of the power signal. These interrupt signals enable the controller to synchronize operation with zero crossings of the power signal.

Zero crossing circuit 84 is of conventional design of the type typically emplqyed with microprocessor based control circuits. Circuit 84 utilizes a comparator 85 to provide interrupt signals on line 86 to controller 40 which change state with each zero crossing of the power signal on line L. Current limiting resistor 87 couples circuit 84 to power line L. A pair of oppositely poled clamping diodes 88a and 88b connected between resistor 87 and neutral line N limit the voltage applied to the comparator circuit to within ±0.7 volt. A voltage divider network comprising resistors 89 and 90 further limits the voltage applied to the non-inverting input of comparator 85 to within its ±0.3 volt normal operating range. Feedback resistor 91 couples the output of comparator 85 to its non-inverting input to provide just enough hysteresis effect to eliminate jitter in the comparator output signal during transitions of the power signal on line L.

The output of comparator 85 switches to a positive voltage level corresponding to logic one level during positive half cycles of the power signal and switches to approximately zero volts corresponding to a logic zero level during negative half cycles of the power signal. Controller 40 is internally configured to recognize transitions of the output of comparator 85 as interrupt signals. Hence, the interrupt rate for an unrectified 60 Hz AC power signal is 120 Hz.

Electronic controller 40 is preferably a self-contained integrated circuit of the type generally referred to as a microprocessor including an arithmetic logic unit, appropriate memory registers, and input and output circuits well known in the art. In the illustrative embodiment controller 40 is a readily commercially available single chip MOS device designated the COP420L manufactured by National Semiconductor Corporation. This device is described in detail in National Semiconductor publication entitled "COP420L/421L and COP320L/321L Single Chip MOS Micro Controllers" copyright April 1980, which is hereby incorporated by reference. In FIG. 3 the user actuable switches 28 and display means 38 are shown in highly schematic block diagram form for purposes of simplicity and clarity. It will be appreciated that the interface of these devices with the microprocessor may be accomplished in well-known conventional fashion.

It will be recalled that an objective of the present invention is to provide a means for initiating appliance operation in a self-diagnostic test mode without requiring additional special hardware in the appliance for initiating operation in this mode. It will be appreciated that the control circuit described thus far includes only the circuitry used for normal operation, except that the microprocessor, as shall be hereinafter described, is programmed to include a self-diagnostic test routine. No external circuitry in the form of hidden switches or plugs etc. has been provided to initiate operation in the self-diagnostic test routine.

In accordance with the present invention means for initiating operation in the diagnostic test mode is provided in the form of external test device 12 which comprises test circuit means 44 adapted for connection to the appliance power lines L and N. The function of test device 12 is to alter the frequency of the power signal applied to the appliance control circuit for a brief period. The appliance controller is programmed to detect this change in frequency of the power signal and to initiate operation in the self-diagnostic mode in response to such detection.

In the illustrative embodiment of FIG. 3 test circuit means 44 comprises test switch 18 connected in shunt with a diode 93. Test switch 18 is switchable between a first or open state shown in FIG. 3 and a second or closed state shunting diode 93. In the first state with switch 18 open diode 93 is connected in series in power line L connecting the appliance control circuit to the power supply. With diode 93 so connected, test circuit 44 is operative to suppress negative half cycles of the AC power signal. Closure of switch 18 switches circuit 44 to its second state with diode 93 shunted. In its second state test circuit 44 couples the power signal directly to the appliance power circuit via lines L and N with no change in the power signal. Test circuit 44 further includes ON/OFF switch 16 in series with diode 93 and test switch 18. It will be appreciated that in the illustrative embodiment the ON/OFF switch for the appliance could be used to initiate power up, eliminating the need for switch 16. However, in some electronically controlled appliances such as microwave ovens, which provide a time-of-day clock display, power is continually applied to the electronics as long as the appliance is plugged in. For such appliances the ON/OFF switch in the test device is particularly advantageous.

When test circuit 44 is in its first state, with switch 16 closed and switch 18 open, the power signal does not go negative. Consequently, the output of zero crossing detector circuit 84 remains positive, and no interrupt signals are input to controller 40, i.e. the interrupt rate changes from 120 Hz to zero. Controller 40 includes means operative during its otherwise conventional power up routine to monitor the pulse rate of the interrupt signals from zero crossing detector 84 to detect a change in the interrupt pulse rate relative to the power signal frequency. Controller 40 responds to the detection of a change in the interrupt pulse rate by initiating its self-diagnostic test routine.

Figure 4:
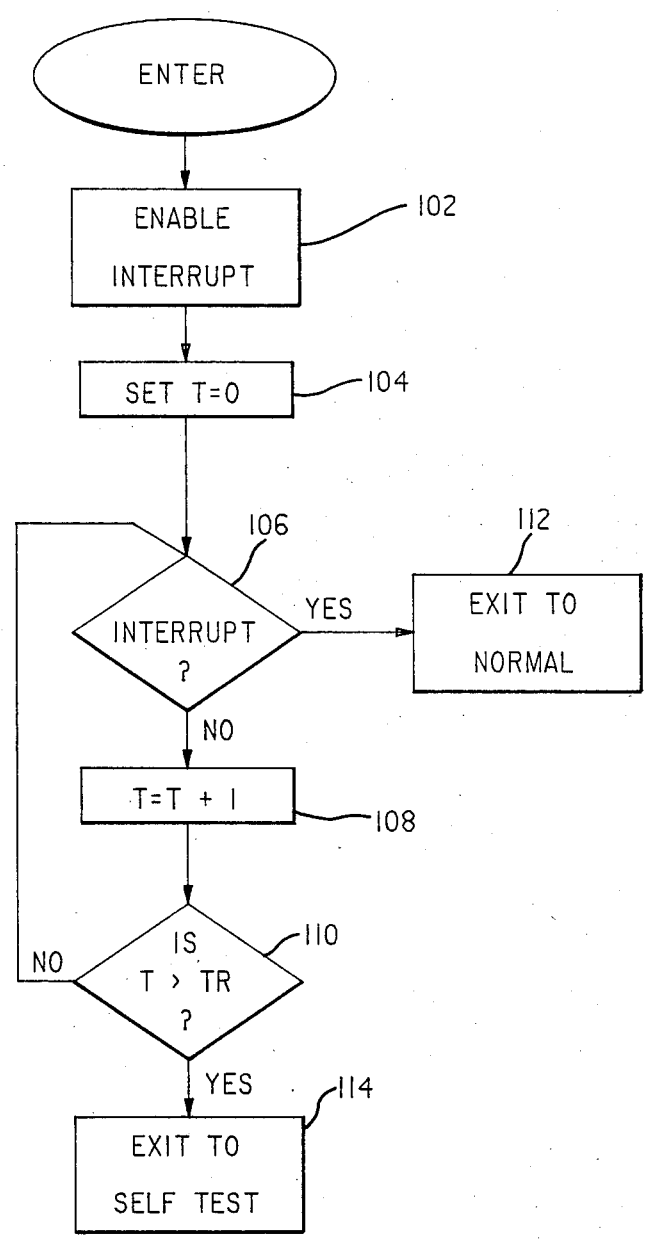
FIGS. 4 and 5 are flow diagrams of control routines which may be used in the microprocessor device of FIG. 3 for initiating a self-diagnostic test routine in accordance with the present invention in the appliance of FIG. 1.
Figure 5:
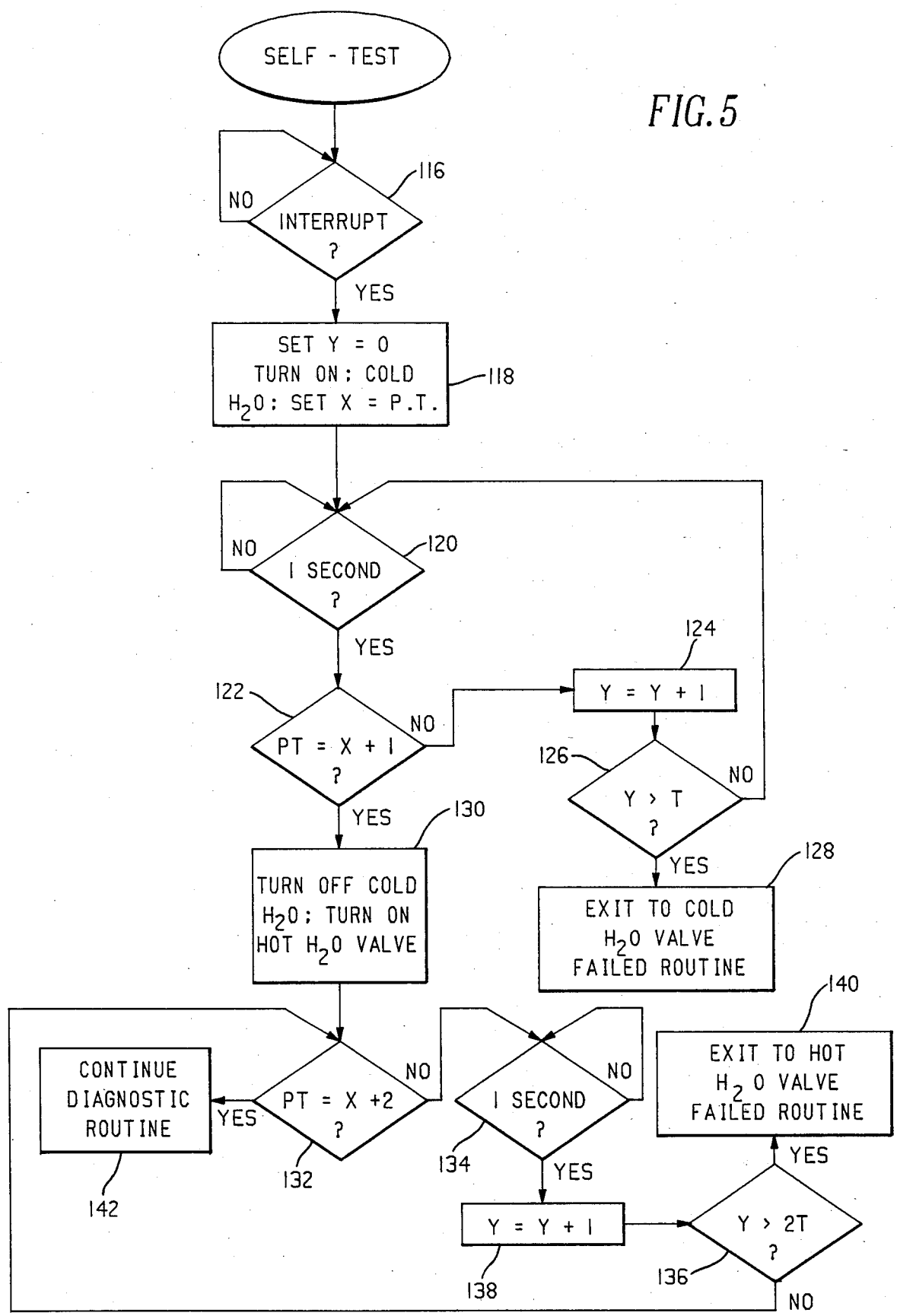

Controller 40 includes a read only memory permanently configured to control operation of washing machine 10 in accordance with a predetermined set of instructions. These instructions comprise a control program which includes a power up routine for controlling the appliance operation in the power up mode immediately following application of power to the appliance, a self-diagnostic test routine for operating the appliance in a diagnostic test mode and a normal routine for operating the appliance in its normal operating mode in accordance with user selected cycle options. FIGS. 4 and 5 are flow diagrams which illustrate that portion of the control program implemented in controller 40 which enables it to selectively initiate operation in the self-diagnostic mode or the normal operating mode in accordance with the present invention. From these diagrams one of ordinary skill in the programming art could prepare a set of instructions for permanent storage in the read only memory of the controller 40. It will be appreciated that the flow charts represent only a portion of the complete control program by which other functions of the washing machine are controlled. Further, since the details of the self-diagnostic test routine to be implemented are not part of the present invention only a very basic portion of the self-diagnostic routine of washing appliance 10 is illustrated herein.

When power is first applied to the appliance, the Power Up routine is entered which in conventional fashion serves to initialize the various counters and registers of the controller and hold the circuit in a reset state until the dc power supply voltages have come up to operating voltage levels. Following such initialization the program enters that portion of the routine illustrated in FIG. 4. The function of this routine is to look for an interrupt signal for a predetermined time period, preferably on the order of 12 milliseconds. If the normal 60 Hz power signal is being applied to the control circuit, an interrupt signal will occur within this time interval. If an interrupt is detected, the program branches to its normal operating routine. If no interrupt is detected, this signifies that the power signal frequency has been changed and the program branches to its self-diagnostic routine.

Referring now to the diagram (FIG. 4), the controller interrupt input is enabled (Block 102) allowing the controller 40 to look for interrupt signals from zero cross detection circuit 84 (FIG. 3) at the associated input port. A counter, T, is set to zero (Block 104) and Inquiry 106 looks for an interrupt signal, i.e. a transition of the output signal from circuit 84. If no interrupt signal is present at the input port, counter T is incremented (Block 108) and Inquiry 110 compares T to a reference count $T_R$. $T_R$ is a reference constant selected to limit the duration of the period during which controller 40 looks for interrupt signals during start-up. In the illustrative embodiment $T_R$ is set to limit this time period to 12 milliseconds. If T is not greater than $T_R$, the time period for monitoring the interrupts has not timed out and the program returns to inquiry 106 to repeat the loop. If during this period an interrupt is received signifying that the power signal is not rectified, the program then branches (Block 112) to the normal operating routine. If no interrupt is received before T exceeds $T_R$ signifying that the power signal is rectified, then the program branches (Block 114) to the self-test routine (FIG. 5).

Referring now to FIG. 5, upon entering the self-test routine Inquiry 116 looks for an interrupt signal from circuit 84. Inquiry 116 delays the program until an interrupt signal is detected to prevent energization of appliance operating components when the power signal is half-wave rectified. If no interrupt signal is present, the routine delays until an interrupt signal is received. The receipt of an interrupt signal signifies that the user has switched the test circuit to its second state and that the power signal is now an unrectified 60 Hz power signal. Upon detecting the interrupt, the program proceeds to execute the self-test routine. The balance of the diagnostic routine to be hereinafter described is merely illustrative. It will be appreciated that the precise nature of the self-diagnostic routine does not constitute a limitation on the present invention. As is apparent from the Background discussion, such routines are well known in the art and vary considerably depending upon the type of appliance and diagnostic objectives.

The function of that portion of the diagnostic routine herein described is to determine if the cold and hot water valves respectively are opening properly. To this end, the present water level in the wash tub is sensed using a water pressure transducer and this information is incremented a small amount and stored in memory as a reference point. The valve is actuated and the water level is monitored for a predetermined time period. If the water fails to exceed the reference level within this time period, this indicates that the valve has failed to open, in which case an appropriate code is displayed at the appliance control panel display 38 (FIG. 2). If the level has increased, the test is repeated for the hot water valve. It will be appreciated that many other diagnostic checks could be performed as well.

Referring again to the flow diagram of FIG. 5, a timing variable Y is initialized to 0, a water level variable X is set to reflect the present water level in the wash tub of the washing machine as sensed by the water pressure transducer (not shown) and the cold water valve is turned on (Block 118). Inquiry 120 delays for 1 second to allow the water to fill, then proceeds to Inquiry 122 to determine if the pressure transducer has sensed an increase in water level from its initial value of X to a new value of X+1. If not, variable Y is incremented (Block 124), and Inquiry 126 compares Y to a reference time which limits the duration of the cold water valve test period. If the cold water test period has not timed out, the program returns to Inquiry 120 and repeats the process. If the pressure fails to increase to X+1 during the period T1, signifying that the cold water valve has failed to open, the program branches (Block 128) to the cold water valve failed routine (not shown) which operates to generate a display code at display 38 (FIG. 2) signifying cold water valve failure.

If the pressure transducer reading exceeds X+1 during time period T1, signifying that the valve has turned on properly, the cold water valve is turned off, and hot water valve is turned on (Block 130). A similar test is initiated by Inquiry 132 which compares the pressure transducer value to a reference of X+2. Inquiries 134 and 136 and Block 138 control time period T2 in the same manner as Inquiries 122 and 126 and Block 124 control the time period T1. If the pressure transducer reading fails to exceed X+2 during time interval T2, this signifies a hot water valve failure and the program branches (Block 140) to the hot water valve failure routine (not shown) which operates to generate the appropriate display code signifying hot water valve failure. If the pressure transducer reading exceeds X+2 during the time period T2, the program continues (Block 142) with further diagnostic testing (not described).

Operation of the illustrative embodiment will now be described with reference to FIGS. 1 and 3. To initiate operation in the self-diagnostic test mode using test device 12, the user plugs the appliance power cord 22 into the receptacle 14 of test device 12. With switch 16 in its OFF position the power cord 20 of test circuit 12 is plugged into a standard 120 volt 60 Hz AC domestic power supply receptacle 21. With the appliance ON/OFF switch 46 turned on, switch 16 turned off, test switch 18 is switched to its test (open) position. ON/OFF switch 16 is then switched to its ON position to apply power to circuit 42 initiating power up operation in the Power Up routine. After a brief time period on the order of 1 second to allow the microprocessor to detect the change in frequency of the power signal the user switches test switch 18 to its RUN (closed) position. Due to the half-wave rectifying effect of diode 93 when switch 18 is open the negative half cycles of the power signal are suppressed. No zero crossings of the power signal occur. Hence, the output of comparator 85 remains logic one. Since no transitions of the comparator output occur, the interrupt pulse rate detected by controller 40 is zero. Controller 40 initities the operation in the self-diagnostic test mode.

For normal operation the appliance is connected directly to the power supply receptacle 21. When so connected, when ON/OFF switch 46 is turned ON the power up routine is executed. Since the power signal is unrectified, an interrupt signal will be detected and the control program will branch to its normal operating routine.

The user switches the test switch 16 to its closed state after about one second, because when operating in the self-diagnostic mode, controller 40 is further operative to delay initiating operation of any of the appliance components to be energized by the power signal until an interrupt signal is detected signifying that the test circuit has been switched by the user to its second state. This prevents any possible damage to the components due to operation energized by the half-wave rectified power signal rather than a full wave power signal.

Figure 6:
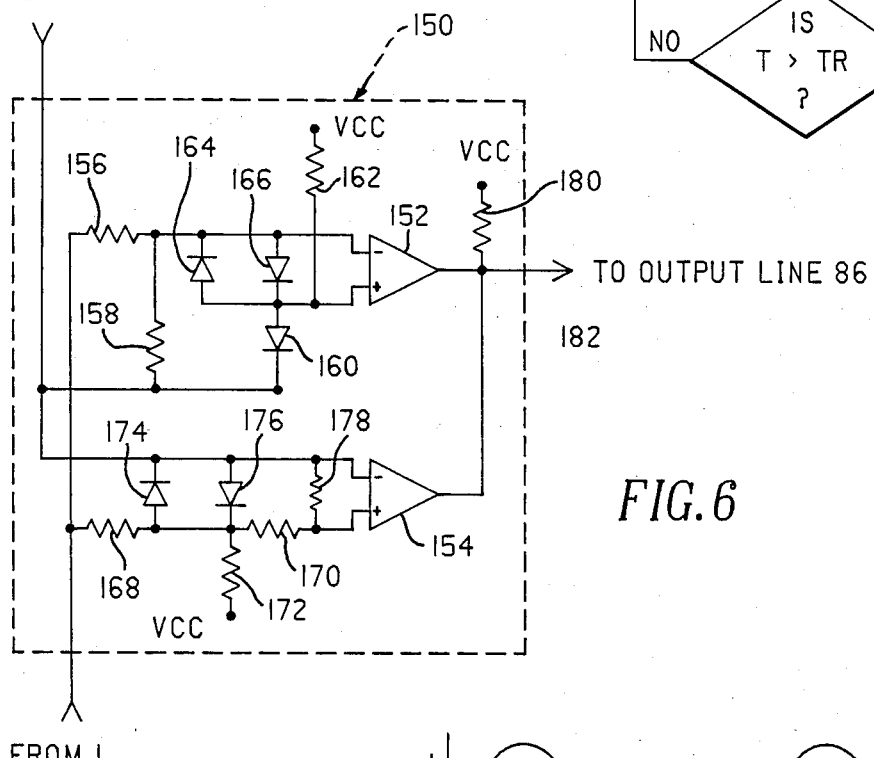
FIG. 6 is a simplified schematic diagram representing an alternative embodiment for the interrupt signal generating circuit portion of the control circuit of FIG. 3.

In the illustrative embodiment of FIG. 3, the interrupt signal generating means comprises zero crossing detector circuit 84. In control circuits in which the zero crossing need not be precisely detected, a threshold detection circuit may be employed to provide interrupt signals for timing purposes. One such threshold detector circuit 150 is illustrated schematically in FIG. 6. Circuit 150 can be substituted for circuit 84 in the control circuit of FIG. 3.

Circuit 150 comprises a pair of comparators 152 and 154. The output state of comparator 152 changes in response to positive half-cycles of the power signal applied across lines L and N. The output state of comparator 154 changes in response to negative half-cycles of the power signal. The output of each comparator is in its high impedance state when its non-inverting input is greater than its inverting input and in its low impedance state otherwise. Comparators 152 and 154 are of the type readily commercially available from National Semiconductor identified by the number LM339N.

Power line L is coupled to comparator 152 via a voltage divider network comprising resistors 156 and 158. The inverting input of comparator 152 is coupled to the junction of resistors 156 and 158. The values of resistors 156 and 158 determine the positive threshold voltage $V_{T+}$, i.e. the point in the positive half-cycle when comparator 152 changes state. Diode 160 coupled between the non-inverting input and neutral line N, in combination with Vcc coupled to the anode terminal of diode 160 via resistor 162 maintains the non-inverting input at a constant reference level of +0.7 volts. Reverse poled diodes 164 and 166 connected between the inverting and non-inverting inputs clamp the voltage difference across the comparator inputs to within ±0.7 volt.

Referring now to comparator 154, power line L is coupled to its non-inverting input via serially connected resistors 168 and 170. Biasing voltage Vcc is coupled to the junction of resistors 168 and 170 via resistor 172. Resistors 168 and 172 comprise a voltage divider, which establishes the negative threshold $V_T$ for comparator 154. Reverse poled diodes 174 and 176 clamp the voltage across the comparator inputs to ±0.7 volt. Resistor 178 connected across the comparator inputs combines with resistor 170 to maintain the voltage applied to the non-inverting input of comparator 154 to greater than −0.3 volts.

The outputs of comparators 152 and 154 are connected in wired OR configuration, providing a circuit output signal on line 182. DC voltage supply Vcc is coupled to output line 182 via pull-up resistor 180. By this arrangement, voltage level Vcc corresponding to a logic one state appears on output line 182 when both comparators are in their high impedance state. When at least one of the comparators is in the low impedance state the output signal on line 182 is at approximately zero volts corresponding to a logic zero state.

Figure 7:
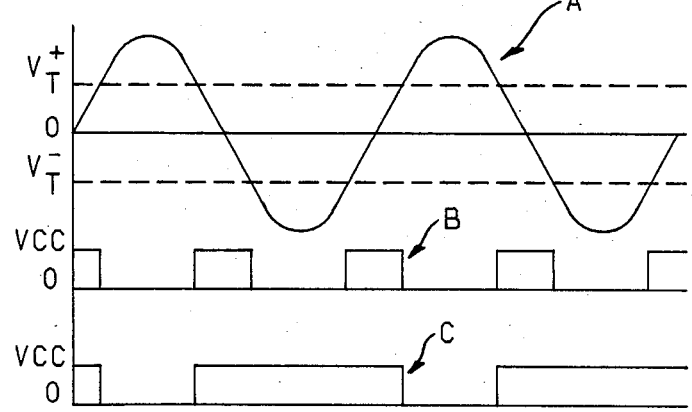
FIG. 7 is a graphical representation of the power signal and the output signal from the circuit of FIG. 6 for each state of the test device of FIG. 1.

In this embodiment the interrupt signals are defined as logic zero or zero volts on line 182. Microprocessor 40 is configured to recognize a logic zero input on line 86 via line 182 as an interrupt signal. Curve A in FIG. 7 represents the 60 Hz power signal on line L. Curve B represents the output pulse train at line 182 of circuit 150 when the 60 Hz power signal is applied across L and N. An interrupt pulse in the form of a logic zero signal marks each pulsation of the power signal. Curve C represents the output on line 182 when the 60 Hz signal is half-wave rectified by diode 93 (FIG. 3). Since the power signal across L and N remains positive, interrupt pulses only occur during the positive half cycles of the power signal. Consequently, the pulse rate for interrupt signals changes from 120 Hz corresponding to the unrectified 60 Hz power signal to 60 Hz corresponding to the half-wave rectified power signal.

Figure 8:
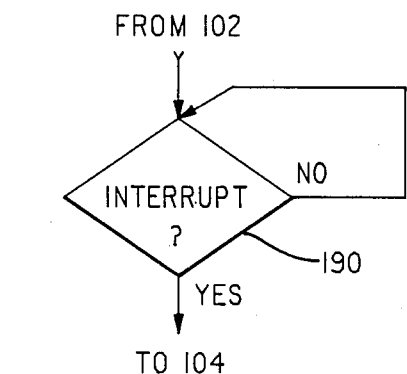
FIGS. 8 and 9 are flow diagrams of modifications to the flow diagrams of FIGS. 4-5 to accommodate the alternative signal generating circuit of FIG. 6 in the control circuit of FIG. 3.
Figure 9:
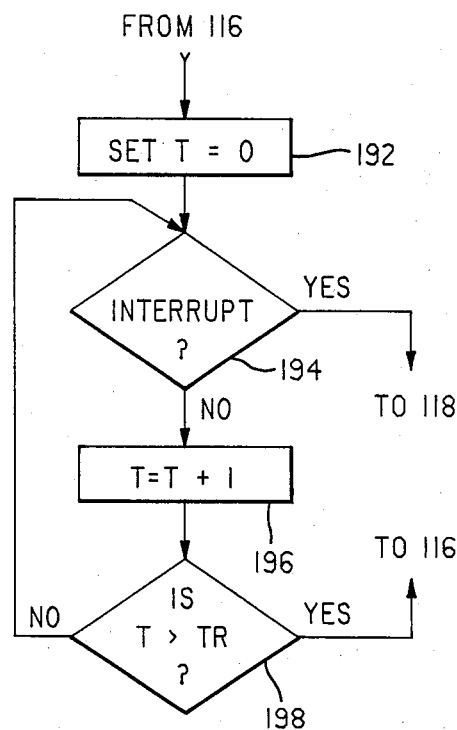

To accommodate threshold detector circuit 150, the control routines of FIGS. 4 and 5 require modification as shown in FIGS. 8 and 9. Inquiry 190 should be inserted between Blocks 102 and 104 in the flow diagram of FIG. 4. The function of Inquiry 190 is to wait for the next occurring interrupt signal before resetting timer T. The balance of the routine then determines whether or not a second interrupt is 10 detected within 12 milliseconds ($T_R = 12$ ms) of the first. If so, the power signal is unrectified and the program exits to the normal operating routine. If no interrupt is detected during the 12 millisecond interval following a yes at Inquiry 190, this signifies that the power signal has been rectified and the program branches to the self-test routine.

The sub-routine illustrated in FIG. 9 is inserted between Inquiry 116 and Block 118 on the flow diagram of FIG. 5. Its function is to look for a first and a second interrupt pulse occurring less than 12 milliseconds apart, signifying that the power signal is no longer rectified. Inquiry 116 (FIG. 5) waits for the next occurring interrupt signal. Timer T is reset (Block 192) and Inquiry 194 looks for an interrupt signal. If none is detected, timer T is incremented (Block 196) and Inquiry 198 determines if the 12 millisecond interval has timed out. If not, the program returns to Inquiry 194 to continue looking for the second interrupt. If it has, the program returns to Inquiry 116 to repeat the entire loop, looking again for a first interrupt. This program remains in this loop until a second interrupt is detected within the 12 millisecond interval following a first interrupt. Following a yes to Inquiry 194, signifying the power signal is no longer rectified, the program proceeds to Block 118 (FIG. 5).

It will be appreciated that there has been described herein apparatus for initiating operation of an electronically controlled appliance in a self-diagnostic test mode using a universal test circuit device external to the appliance which test device can be used to initiate self-test for any appropriately programmed electronically controlled appliance.

While in accordance with the Patent Statues specific illustrative embodiments of the present invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. For an appliance of the type having a control circuit including logic control means for operating the appliance in a start-up mode each time power is applied to the control circuit and thereafter selectively in a normal operating mode or in a self-diagnostic/test mode, and energized by an alternating current power signal from an external power supply having a fixed nominal frequency coupled to the appliance by power lines, apparatus for initiating operation in the self-diagnostic/test mode comprising:

test circuit means adapted for connection in the power lines between the appliance and the power supply, said test circuit means being selectively switchable between a first state and a second state and operative in its first state to suppress power signal half-cycles of one polarity and in its second state to couple the power signal unchanged to the appliance control circuit;

means included in the control circuit for generating interrupt pulses marking the zero crossings of the power signal;

means included in the logic control means operative in the start-up mode to monitor the pulse rate of said interrupt pulses for a period of predetermined duration and detect a pulse rate different from that associated with the normal power supply frequency and to initiate operation in the self-diagnostic/test mode if such a change is detected and to initiate operation in the normal mode otherwise, whereby appliance operation in the self-diagnostic/test mode is initiated by switching said test circuit to its first state.

2. Apparatus of claim 1 wherein said test circuit means comprises a user operable test switch adapted for connection in one power line and a diode connected in shunt with said test switch; said circuit being in its first state when said test switch is open and in its second state when said test switch is closed, whereby the diode half-wave rectifies the power signal to the appliance in said first state and the diode is shunted in said second state.

3. The apparatus of claim 2 wherein said test circuit means further comprises a user actuable ON/OFF switch serially connected to said test switch and diode.

4. For an appliance of the type having a control circuit including logic control means for operating the appliance in a power up mode each time power is applied to the appliance followed by selective operation in a self-diagnostic/test mode or a normal operating mode and energized by a pulsating power signal from an external power supply having a fixed nominal frequency, coupled to the appliance by power lines, apparatus for initiating operation in the self-diagnostic/test mode comprising:

test circuit means adapted for connection in the power lines between the control circuit and the power supply, said test circuit means being selectively switchable between a first state and a second state and operative in its first state to change the frequency of the power signal applied to the control circuit and in its second state to couple the power signal to the control circuit at the power supply frequency;

means included in the control circuit for generating interrupt pulses marking pulsations of the power signal;

means included in the logic control means responsive to said interrupt pulses and operative in the power up mode to detect a change in pulse rate relative to that representative of the nominal power supply frequency signifying said test circuit means being in its first state, and to initiate the self-diagnostic test mode upon detection of said change and to initiate the normal operating mode otherwise, whereby operation in the self-diagnostic/test mode is initiated by switching said test circuit means to its first state.

5. The apparatus of claim 4 further comprising means included in said logic control means operative in said self-diagnostic/test mode to delay appliance operation until said test circuit means is switched to its second state.

6. Apparatus of claim 5 wherein said test circuit means comprises a user operable test switch adapted for connection in one power line and a diode connected in shunt with said test switch; said circuit being in its first state when said test switch is open and in its second state when said test switch is closed, whereby the diode halfwave rectifies the power signal to the appliance in said first state and the diode is shunted in said second state.

7. The apparatus of claim 6 wherein said test circuit means further comprises a user actuable ON/OFF switch serially connected to said test switch and diode.

8. For an appliance having a control circuit including a microprocessor including a read only memory having a control program stored therein, which program includes a power up routine for controlling appliance operation in its power up mode following application of power to the appliance, a self-diagnostic test routine for operating the appliance in a diagnostic/test mode and a normal routine for operating the appliance in its normal operating mode, which control circuit is energized by an alternating current power signal from a power supply coupled to the appliance by power lines, apparatus for initiating operation in the self-diagnostic/test mode comprising:

test circuit means adapted for connection in the power lines between the appliance and the power supply, said test circuit means being selectively switchable between a first state and a second state and operative in its first state to suppress power signal half-cycles of one polarity and in its second state to couple the power signal unchanged to the appliance control circuit;

means responsive to said power signal for generating interrupt pulses marking the zero crossings of the power signal;

the microprocessor including means operative during execution of the power up routine to monitor said interrupt pulses and detect a difference in interrupt pulse rate relative to the nominal power supply frequency, to branch to the self-diagnostic/test routine if such a difference is detected and to branch to the normal operating routine otherwise, whereby operation of the appliance in the diagnostic mode is initiated by switching said test circuit means to its first state prior to applying power to the appliance.

9. The apparatus of claim 8 wherein the microprocessor includes means operative during execution of the self-diagnostic test routine to monitor the interrupt pulses and delay appliance operation until an interrupt pulse is detected signifying said test circuit means having been switched to its second state.

* * * * *